(12) United States Patent
Hoad

(10) Patent No.: US 6,712,895 B1
(45) Date of Patent: Mar. 30, 2004

(54) BITUMINOUS FOAM

(75) Inventor: Leslie Hoad, Cheshire (GB)

(73) Assignee: Totalfinaelf Bitumen Limited, Preston (GB)

( * ) Notice: Subject to any disclaimer, the term of this patent is extended or adjusted under 35 U.S.C. 154(b) by 0 days.

(21) Appl. No.: 10/009,510

(22) PCT Filed: May 5, 2000

(86) PCT No.: PCT/GB00/01723

§ 371 (c)(1),
(2), (4) Date: Jun. 3, 2002

(87) PCT Pub. No.: WO00/68302

PCT Pub. Date: Nov. 16, 2000

(30) Foreign Application Priority Data

May 8, 1999 (GB) .............................................. 9910643

(51) Int. Cl.⁷ .............................................. C08L 95/00
(52) U.S. Cl. ........................ 106/122; 106/277; 106/278; 427/373; 427/427; 521/29; 521/83

(58) Field of Search .................................. 106/277, 278, 106/122; 427/373, 427; 521/83, 79

(56) References Cited

U.S. PATENT DOCUMENTS 4,692,350 A * 9/1987 Clarke et al.

FOREIGN PATENT DOCUMENTS

WO 9324573 12/1993

* cited by examiner

Primary Examiner—Morton Foelak
(74) Attorney, Agent, or Firm—Goodwin Procter LLP

(57) ABSTRACT

A method of producing a bituminous foam includes supplying a bitumen in water emulsion from a tank (2) into primary and secondary heating circuits (8, 34), whereby the emulsion is heated (via heating coils 12 and 12') and its pressure raised such that, on discharge to ambient conditions via outlet pipes (30 or 30'), the emulsion foams as water evaporates therefrom.

34 Claims, 1 Drawing Sheet

BITUMINOUS FOAM

CROSS-REFERENCE TO RELATED APPLICATION

This application claims priority from PCT/GB00/01723, which published in English on Nov. 16, 2000, which in turn claims priority from GB 9910643.7.

BACKGROUND OF THE INVENTION

This invention relates to a method of producing a bituminous foam. An apparatus for carrying out the method and a method using the foam are also described.

This invention relates to a method of producing a bituminous foam. An apparatus for carrying out the method and a method using the foam are also described.

Foamed bitumen binders have been known for many years. For example, up to and during the late 1940's and 1950's, when steam road sprayers and steam rollers were commonly used in road preparation, foaming of a coal tar binder was an established practice for use in grouting techniques and for stabilisation of road bases. In the process, superheated steam was used to raise the temperature of tar to about 120° C. prior to injection of low pressure steam (wet steam) immediately prior to discharge through a hand lance or spray bar jets. This provided a crude (but nonetheless effective) means of creating foam thereby to increase the volume of the tar (binder) and assist dispersion of the tar into a road under construction immediately after contact of the tar with the road, roller tines and harrows were used to effect in situ mixing.

U.K. Patent No. GB 1 325 916 (Mobil) describes a method and apparatus for producing foamed materials, especially foamed bituminous materials. The method essentially comprises providing bitumen at an elevated temperature and then mixing the hot bitumen with a liquid, for example water, which is insoluble in the bitumen. The liquid evaporates on discharge of the mixture to ambient conditions and thereby causes expansion of the bitumen which, accordingly, foams. Thus, in essence, the method comprises a two-stage process. Disadvantageously, the two stage process necessitates very careful control of the flow rates of the bitumen and water and, accordingly, relatively complicated apparatus. Furthermore, the second stage of the process is potentially hazardous due to the violent reaction between hot bitumen and water.

It is an object of the present invention to address the above described problems.

SUMMARY OF THE INVENTION

According to a first aspect of the present invention, there is provided a method of producing a bituminous foam, the method comprising raising the temperature of an emulsion which includes bitumen and a liquid which is substantially insoluble in said bitumen (hereinafter "said insoluble liquid"); and discharging said emulsion from a first environment wherein the pressure is $P_1$ to a second environment wherein the pressure is $P_2$ and $P_1 > P_2$, whereby said emulsion foams after discharge into said second environment.

Said insoluble liquid may be such as to produce a relatively high ratio of vapour per wt % thereof included in said emulsion. To this end, said insoluble liquid preferably has a low molecular weight which is suitably less than 100, preferably less than 80, more preferably less than 65. Said insoluble liquid may comprise a mixture of components. Said insoluble liquid may be water or a lower alcohol, especially a $C_{1-3}$ alcohol, or a mixture comprising any of the aforesaid. Preferably, said insoluble liquid comprises a major amount of water.

In the context of this specification, a "major amount" may mean at least 60 wt %, suitably at least 75 wt %, preferably at least 90 wt %, more preferably at least 95 wt %, especially at least 99 wt % of the referenced component is present in a referenced formulation.

Preferably, said insoluble liquid consists essentially of water.

In the method, the temperature of said emulsion is suitably raised, under said pressure $P_1$, to a temperature at which it can vaporize sufficient of said insoluble liquid to produce the amount of vapour required for the desired expansion of the bitumen on foaming after discharge into said second environment. The emulsion may be exparded to produce a foam in said second environment, wherein the ratio of the volume of foam to the volume of said emulsion present initially is at least 5, suitably at least 10, preferably at least 15, especially at least 20.

The temperature of said emulsion at discharge is preferably greater than the boiling point of said insoluble liquid, suitably by at least 100° C., preferably at least 150° C., more preferably at least 200° C., especially at least 250° C.

The temperature of said emulsion at discharge is suitably not more than 100° C., preferably not more than 80° C., more preferably not more than 60° C., especially not more than 50° C., greater than the boiling point of said insoluble liquid.

The temperature of said emulsion at discharge may be at least 105° C., suitably at least 110° C., preferably at least 115° C., more preferably at least 120° C., especially at least 125° C.

The temperature of said emulsion at discharge may be less than 200° C., suitably less than 190° C., preferably less than 180° C., more preferably less than 170° C., especially less than 160° C.

In the method, the temperature of the emulsion may be raised through at least 20° C., suitably at least 40° C., preferably at least 60° C., more preferably at least 80° C., especially at least 100° C. The temperature may be raised through less than 200° C., suitably less than 180° C., preferably less than 160° C., especially through less than 140° C.

The temperature of said emulsion immediately prior to it being raised in the method may be at least ambient temperature.

Said emulsion preferably has a viscosity at 20° C. in the range 0.2 to 800 Poise. The viscosity at 80° C. may be in the range 0.1 to 100 Poise A first heating means is suitably provided for raising the temperature of said emulsion. Said first heating means preferably does not cause a change in concentration of said bitumen or said insoluble liquid in said emulsion as would occur, for example, if a heated liquid was contacted with said emulsion for heating it. Said first heating means preferably comprises a heated solid body arranged to transfer heat to said emulsion by conduction. For example, said emulsion may be passed through a convoluted heating assembly, for example a heating coil, which may be heated by suitable means, for example by circulation of a heated fluid and/or by electrical heating means.

Preferably, in the method, said temperature of said emulsion is raised as described herein when said emulsion is in said first environment. Thus, said temperature is preferably raised whilst said emulsion is within an apparatus in which the pressure is $P_1$.

Preferably, $P_1$ is at least $1.0 \times 10^5$ N/m$^2$, more preferably at least $1.5 \times 10^5$ N/m$^2$, especially at least $2.0 \times 10^5$ N/m$^2$. $P_1$ may be less than $4 \times 10^5$ N/m$^2$, preferably less than $3.5 \times 10^5$ N/m$^2$, more preferably $3.0 \times 10^5$ N/m$^2$ or less.

Preferably, the pressure of said emulsion is raised to said pressure $P_1$ in said first environment. Prior to entry into said first environment, the emulsion may be at a pressure of less than $P_1$ which may be ambient pressure.

$P_2$ is preferably ambient pressure.

The temperature in said second environment is preferably less than the temperature in said first environment, suitably by at least 50° C., preferably at least 60° C., more preferably at least 70° C., especially at least 80° C. The temperature in said second environment is preferably ambient temperature.

The method is suitably carried out in an apparatus having a first region in which the pressure of an emulsion therein is arranged to be raised to said pressure $P_1$. An inlet is suitably provided for passage of an emulsion into the first region and an outlet is suitably provided for passage of the emulsion, under pressure, out of said first region, suitably to said second environment. Said first heating means described above is suitably provided between the inlet and outlet for heating the emulsion in the first region. A first pump means is suitably provided for pumping the emulsion within the first region and, suitably, for raising the pressure thereof. The apparatus may be arranged for circulating the emulsion within the first region. First outlet valve means is suitably provided for allowing the passage of said emulsion, under pressure, out of said first region from where it may be directed to a desired location.

A feedstock supply means is preferably provided upstream of said first region. In the method, said feedstock supply means suitably contains said emulsion prior to its supply to said first region wherein its temperature is raised. The emulsion associated with said feedstock supply means is preferably held at ambient pressure. Said emulsion may be held at ambient temperature. It may, however, be desirable for a second heater means to be associated with said feedstock supply means, wherein said second heater means is arranged to raise the temperature of the emulsion associated with said feedstock supply means. Said second heater means may be arranged to raise the temperature to at least 40° C., suitably at least 50° C., preferably at least 60° C., more preferably at least 70° C., especially to at least 80° C.

Preferably, the only feedstock used in said method is a feedstock of said emulsion. That is, suitably no water, steam and/or other feedstock is separately fed into said apparatus.

Preferably, the composition of said emulsion in the feedstock supply means is substantially the same as the composition of the emulsion when present in said first region, after heating. That is, preferably, no component (especially no water or steam) is added to the emulsion after entry of it into said first region.

Said apparatus may include a second region in which the pressure of an emulsion therein is arranged to be raised to a pressure $P_1$. An inlet for passage of emulsion into said second region may communicate with an outlet from said first region. Said first pump means described above is preferably arranged to pump emulsion in said second region. Means may be provided for raising the temperature of the emulsion in said second region. Second outlet valve means is suitably provided for allowing passage of said emulsion, under pressure, out of said second region from where it may be directed to a desired location.

Said emulsion used in said method may include at least 50 wt %, suitably at least 55 wt %, preferably at least 60 wt %, more preferably at least 65 wt % bitumen. Said emulsion may include 95 wt % or less, suitably 90 wt % or less, preferably 85 wt % or less, more preferably 80 wt % or less of bitumen.

Said emulsion suitably includes at least 10 wt %, preferably at least 15 wt %, more preferably at least 20 wt % water. Said emulsion may include 45 wt % or less, suitably 40 wt % or less, preferably 35 wt % or less, more preferably 30 wt % or less of water.

Said emulsion may have a pH of at least 1, preferably at least 1.5. The pH may be 5 or less, suitably 4.5 or less, preferably 4.0 or less, more preferably 3.5 or less.

Said emulsion may include an inorganic acid for adjusting the pH. Alternatively, an anionic emulsion may be prepared using a sodium hydroxide pH balanced aqueous phase so that the finished emulsion has a pH in the range about 11–12.

Said emulsion preferably includes one or more surface active agents, for example emulsifiers and/or adhesion agents. The total amount of surface active agents present in said emulsion may be at least 0.1 wt %, preferably at least 0.15 wt %, more preferably at least 0.20 wt %. The total amount may be less than 2 wt %, preferably less than 1.5 wt %, more preferably less than 1.0 wt %, especially less than 0.8 wt %.

Said emulsion may be anionic, cationic or non-ionic in nature and said surface active agents may be selected accordingly. Preferred surface active agents are amines, for example N-alkyl tallow 1,3-propylene diamine, derivatives of tallow propylene diamine and associations of alkylamido polyamines and alkyl imidazo polyamines, and lignosulphonates.

The surface active agents may be primarily for maintaining the water as an emulsion in said bitumen. However, the presence of suitable surface active agents may enhance the end performance of the foam by, for example, aiding stone coating and cohesion in low temperature techniques. Alkylamidoamines/polyethylene polyamine combinations and lignosulphonates may be particularly useful in this regard.

Said emulsion may include a modifying means for modifying the properties of the bitumen. Preferred modifying means may be organic polymers or copolymers, for example styrene-butadiene polymer, styrene-butadiene-styrene copolymer, ethylene vinyl acetate polymer, and oils, for example tall oils and/or any of the individual constituents thereof.

Where a modifying means is provided in said emulsion, it may contain less than 7 wt %, suitably less than 6 wt %, preferably less than 4 wt %, more preferably less than 3 wt %, especially 2 wt % or less of said modifying means.

Said emulsion may include flux oils (volatile or non-volatile), for example in the event that the foam is to be used as a means of reactivating residual bitumen in recycled road materials.

According to a second aspect of the invention, there is provided an apparatus for producing a bituminous foam, the apparatus having a first region for containing an emulsion wherein a first heating means is provided for raising the temperature of said emulsion and a pressure means is provided for raising the pressure of said emulsion to a pressure $P_1$, an inlet being provided for passage of a feedstock from a feedstock supply means into said first region and an outlet being provided for passage of the emulsion out of the first region and into a second environment at a pressure $P_2$, wherein the pressure $P_2$ is less than $P_1$.

Said feedstock supply means preferably contains an emulsion which includes bitumen and a said insoluble liquid. Said first region may contain an emulsion which includes bitumen and a said insoluble liquid.

According to a third aspect of the invention, there is provided a method of contacting a substrate with a bituminous foam, the method comprising directing foam produced according to said first aspect and/or using an apparatus according to said second aspect towards said substrate thereby to contact it.

Said substrate may be stone or a road (or other) surface. Said substrate may comprise particulate material.

The invention extends to a bituminous foam when produced in a method according to said first aspect and/or using an apparatus according to said second aspect.

Any feature of any aspect of any invention or embodiment described herein may be combined with any feature of any aspect of any other invention or embodiment described herein.

DETAILED DESCRIPTION OF THE INVENTION

Figure 1:
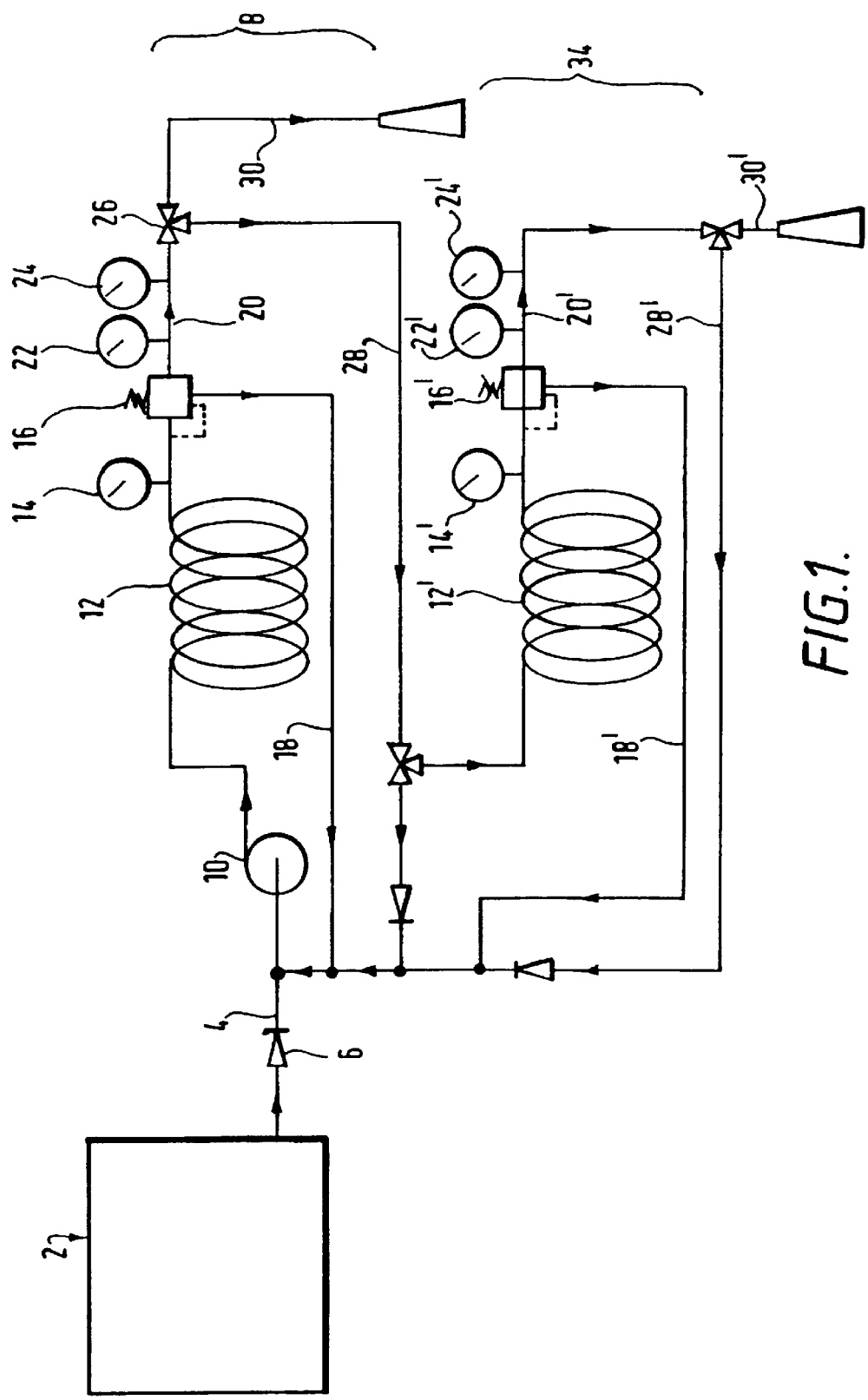
FIG. 1 depicts an apparatus useful in the method of this invention.

Specific embodiments of the invention will now be described, by way of example, with reference to FIG. 1 which is a schematic representation of an apparatus for producing a bituminous foam.

A key to the symbols used in FIG. 1 is provided in the figure.

Referring to FIG. 1, a tank 2 containing a bitumen emulsion feedstock communicates via pipe 4, in which a non-return valve 6 is arranged, with a primary heating circuit 8. A pump 10 is arranged to pump the fluid through a primary heating coil 12. The coil may have a length of about 4 meters and about 10 convolutions. Downstream of coil 12 is a pressure gauge 14 and downstream thereof a pressure relief three-way valve 16 which is arranged to control the flow of fluid between a return pipe 18 and a pipe 20 in which a pressure gauge 22 and a temperature gauge 24 are arranged. Downstream of gauge 24 is a three-way valve 26 which controls the flow of fluid into an outlet pipe 30 and a primary recirculation pipe 28 which is arranged to recirculate fluid to the coil 12 via pump 10 and/or to a secondary coil 12' of a secondary heating circuit 34. The secondary heating circuit is similar to the primary heating circuit 8 and the same or similar parts are annotated with the same reference numerals, augmented with a "'" character.

The pump 10 and the apparatus downstream thereof are suitably arranged such that a back pressure in the range 1.5–2.5 bar ($1.5 \times 10^5$ N/m² to $2.5 \times 10^5$ N/m²) is measured by the pressure gauge 14. Pressure relief valves may be arranged to regulate throughput and/or pressure levels and to enable quick and positive adjustment of same. Heat transfer to emulsion within the apparatus may be via hot oil (at a temperature of the order of 200° C.) through jacketed heating coils. Electrical line tracing may be used to monitor and control temperature. The optional use of the secondary coil 34 and associated apparatus provides a means of boosting temperature and/or pressure at a point of discharge of the emulsion or, alternatively, to maintain a standardized level of temperature and/or pressure at a higher rate of throughput than would be possible with the primary coil 12 and associated apparatus alone.

As an alternative to the primary and secondary heating circuits 8, 34 being similar as described above, one of the circuits may include a heating coil 12 or 12' of a larger bore and/or throughput capacity than the heating coil in the other circuit. For example, one coil may have a bore diameter of 25 mm and the other a diameter of 15 mm and, as a result, under constant pump throughput, the back-pressure generated in the 15 mm bore will be higher than that generated in the 25 mm bore. The arrangement described provides a means of varying internal pressures within the apparatus and a means of influencing the pressure and characteristics of the foam discharged from the apparatus. In this regard, if the diameter of heating coil 12 is larger than coil 12', then the pressure at discharge point 30' may be relatively higher; whereas, if coil 12 has a smaller diameter than coil 12', the pressure at point 30' may be lower.

Thus, the arrangement and/or functioning of the secondary coil may be a means of regulating pressure within the apparatus.

The bitumen emulsion feedstock may be any emulsion of bitumen in water. Details of suitable emulsions are described in Examples 1 to 3.

EXAMPLE 1

Bitumen (200 pen; 65.0 wt %) was heated to a temperature in the range 100° C. to 140° C. and fed into a colloid mill. N-Alkyl Tallow 1,3-propylene diamine (0.25 wt %), hydrochloric acid (28% HCl, 0.25 wt %) (in a quantity to produce a pH of 1.5–3.5 in the final bitumen emulsion formulation) and water (34.5 wt %) were also fed into the colloid mill. In the colloid mill, the bitumen is caused to form small globules which become coated with emulsifier so that a stable emulsion of bitumen in water is formed.

By a process analogous to that in Example 1, the emulsions of Examples 2 and 3 were prepared, using the components described.

EXAMPLE 2

Bitumen (300 pen; 75 wt %)
Alkyl Amido Polyamine/Alkyl imidazo polyamine (0.7 wt %)
Hydrochloric acid (28%, 0.6 wt %)
Styrene-butadiene-styrene co-polymer(2.0 wt %)
Water (21.7 wt %)

EXAMPLE 3

Bitumen (200 pen; 78 wt %)
N-alkyl Tallow 1,3-propylene diamine (0.25 wt %)
Hydrochloric acid (28%, 0.25 wt %)
Alkylamidoamine/polyethylene polyamine (0.3 wt %)
Water (21.2 wt %)

In use, an emulsion is heated in tank 2 to a temperature of about 80° C. and is fed into the apparatus and pumped therein by pump 10 so that the pressure of the emulsion is in the range 1.5–2.5 bar ($1.5 \times 10^5$ N/m² to $2.5 \times 10^5$ N/m²) and is heated so that its temperature is about 120° C. On discharge from the apparatus to ambient conditions (i.e. atmospheric temperature and pressure), the water turns to steam and causes the bitumen to foam to many times its original volume of the emulsion. The foamed bitumen may be directed to a desired location for use.

Uses of the foamed bitumen may be as follows:
(i) to coat stone—the foamed bitumen is suitably mixed with heated stone;
(ii) in-situ base stabilisation—the foamed bitumen is applied to a stone-containing base material with a potential improvement in the area of coating of the stone and/or the penetration into the base;
(iii) stabilisation of embankments and gradients—progressive stone layers can be applied to take full advantage of binder expansion;
(iv) recycling of recovered materials—the foamed bitumen may be applied to materials such as road planings to re-activate residual bitumen in situ on a progressive timescale.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of producing a bituminous foam, the method comprising raising the temperature of an emulsion which includes bitumen and a liquid which is substantially insoluble in said bitumen (hereafter "said insoluble liquid"); and discharging said emulsion from a first environment wherein the pressure is $P_1$ to a second environment wherein the pressure is $P_2$ and $P_1 > P_2$, whereby said emulsion foams after discharge into said second environment.

2. A method according to claim 1, wherein said insoluble liquid comprises a major amount of water.

3. A method according to claim 1, wherein said insoluble liquid comprises at least 90 wt. % water.

4. A method according to claim 1, wherein the emulsion is expanded to produce a foam in said second environment, wherein the ratio of the volume of foam to the volume of said emulsion present initially is at least 5.

5. A method according to claim 1, wherein the temperature of said emulsion at discharge is greater than the boiling point of said insoluble liquid.

6. A method according to claim 1, wherein the temperature of said emulsion at discharge is at least 105° C.

7. A method according to claim 1, wherein the temperature of said emulsion at discharge is less than 200° C.

8. A method according to claim 1, wherein said emulsion has a viscosity at 20° C. in the range 0.2 to 800 poise.

9. A method according to claim 1, wherein a first heating means is provided for raising the temperature of said emulsion, wherein said first heating means does not cause a change in concentration of said bitumen or said insoluble liquid in said emulsion.

10. A method according to claim 1, wherein a first heating means is provided for raising the temperature of said emulsion and said first heating means comprises a heated solid body arranged to transfer to said emulsion by conduction.

11. A method according to claim 1, wherein said temperature of said emulsion is raised when said emulsion is in said first environment.

12. A method according to claim 1, wherein $P_2$ is ambient pressure.

13. A method according to claim 1, said method being carried out in an apparatus having a first region in which the pressure of an emulsion therein is arranged to be raised to said pressure $P_1$; an inlet for passage of an emulsion into the first region; an outlet for passage of the emulsion, under pressure, out of said first region; a heating means for heating the emulsion in the first region; and a first pump means for pumping the emulsion within the first region.

14. A method according to claim 13, wherein said apparatus includes a feedstock supply means upstream of said first region, wherein said feedstock supply means contains emulsion prior to its supply to said first region wherein its temperature is raised.

15. A method according to claim 14, wherein the composition of said emulsion in the feedstock supply means is substantially the same as the composition of the emulsion when present in said first region after the temperature of said emulsion has been raised in said method.

16. A method according to claim 1, wherein the only feedstock used in said method is a feedstock of said emulsion.

17. A method according to claim 1, wherein said emulsion used in said method includes at least 50 wt. % bitumen.

18. A method according to claim 1, wherein said emulsion includes at least 10 wt. % water.

19. A method of contacting a substrate with a bituminous foam, the method comprising: (a) providing a bituminous foam by raising the temperature of an emulsion which includes bitumen and a liquid which is substantially insoluble in said bitumen, and discharging said emulsion from a first environment wherein the pressure is $P_1$ to a second environment wherein the pressure is $P_2$ and $P_1 > P_2$, whereby said emulsion foams after discharge into said second environment; and (b) directing the foam towards said substrate thereby to contact it.

20. A method according to claim 19, wherein said substrate comprises particulate material.

21. A bituminous foam produced in a method comprising raising the temperature of an emulsion which includes bitumen and a liquid which is substantially insoluble in said bitumen, and discharging said emulsion from a first environment wherein the pressure is $P_1$ to a second environment wherein the pressure is $P_2$ and $P_1 > P_2$, whereby said emulsion foams after discharge into said second environment.

22. A method according to claim 1, wherein the temperature of said emulsion is raised through at least 200° C.

23. A method according to claim 1, wherein the temperature of said emulsion is raised through at least 400° C.

24. A method according to claim 1, wherein the temperature of said emulsion is raised through at least 800° C.

25. A method according to claim 13, wherein said apparatus includes a feedstock supply means upstream of said first region, said feedstock supply means containing said emulsion, wherein, in the method, said emulsion is supplied to said first region from said feedstock supply means.

26. A method according to claim 25 wherein the only feedstock used in said method is said emulsion supplied from said feedstock supply means.

27. A method according to claim 13, wherein the composition of said emulsion in the feedstock supply means is substantially the same as the composition of the emulsion when present in said first region, after heating.

28. A method according to claim 13, wherein no component is added to the emulsion after entry of it into said first region.

29. A method according to claim 1, wherein said emulsion includes at least 50 wt. % and 95 wt. % or less of bitumen.

30. A method according to claim 29, wherein said emulsion includes at least 10 wt. % of water.

31. A method according to claim 30, wherein said emulsion has a pH of at least 1 and 5 or less.

32. A method according to claim 30, wherein said emulsion includes at least 0.1 wt. % and less than 2 wt. % of surface active agents.

33. A method as claimed in claim 19, wherein the temperature of said emulsion is raised through at least 20° C. in the method.

34. A method as claimed in claim 21, wherein the temperature of said emulsion is raised through at least 20° C.

* * * * *